United States Patent [19]

Smith

[11] Patent Number: 4,734,227
[45] Date of Patent: Mar. 29, 1988

[54] METHOD OF MAKING SUPERCRITICAL FLUID MOLECULAR SPRAY FILMS, POWDER AND FIBERS

[75] Inventor: Richard D. Smith, Richland, Wash.

[73] Assignee: Battelle Memorial Institute, Richland, Wash.

[21] Appl. No.: 838,932

[22] Filed: Mar. 12, 1986

Related U.S. Application Data

[63] Continuation-in-part of Ser. No. 528,723, Sep. 1, 1983, Pat. No. 4,582,731.

[51] Int. Cl.$^4$ ................................................. B29B 9/10
[52] U.S. Cl. ............................................ 264/13; 264/6; 528/501; 528/502
[58] Field of Search ................ 118/300, 308; 210/658; 264/12, 5, 6, 13, 204, 205; 427/421; 528/501, 502, 503

[56] References Cited

U.S. PATENT DOCUMENTS 3,981,957  9/1976  van Brederode et al. ............ 264/12
4,012,461  3/1977  van Brederode ..................... 264/12

OTHER PUBLICATIONS

V. J. Krukonis, Supercritical Fluid Nucleation of Difficult-to-Comminute Solids, presented at 1984 meeting, AIChE, San Francisco, Nov. 25-30, 1984 and published Nov. 1985.

*Primary Examiner*—Jan H. Silbaugh
*Assistant Examiner*—Mary Lynn Fertig
*Attorney, Agent, or Firm*—Marger & Johnson

[57] ABSTRACT

Solid films are deposited, or fine powders formed, by dissolving a solid material into a supercritical fluid solution at an elevated pressure and then rapidly expanding the solution through a heated nozzle having a short orifice into a region of relatively low pressure. This produces a molecular spray which is directed against a substrate to deposit a solid thin film thereon, or discharged into a collection chamber to collect a fine powder. In another embodiment, the temperature of the solution and nozzle is elevated above the melting point of the solute, which is preferably a polymer, and the solution is maintained at a pressure such that, during expansion, the solute precipitates out of solution within the nozzle in a liquid state. Alternatively, a secondary solvent mutually soluble with the solute and primary solvent and having a higher critical temperature than that of primary solvent is used in a low concentration (<20%) to maintain the solute in a transient liquid state. The solute is discharged in the form of long, thin fibers. The fibers are collected at sufficient distance from the orifice to allow them to solidify in the low pressure/temperature region.

15 Claims, 22 Drawing Figures

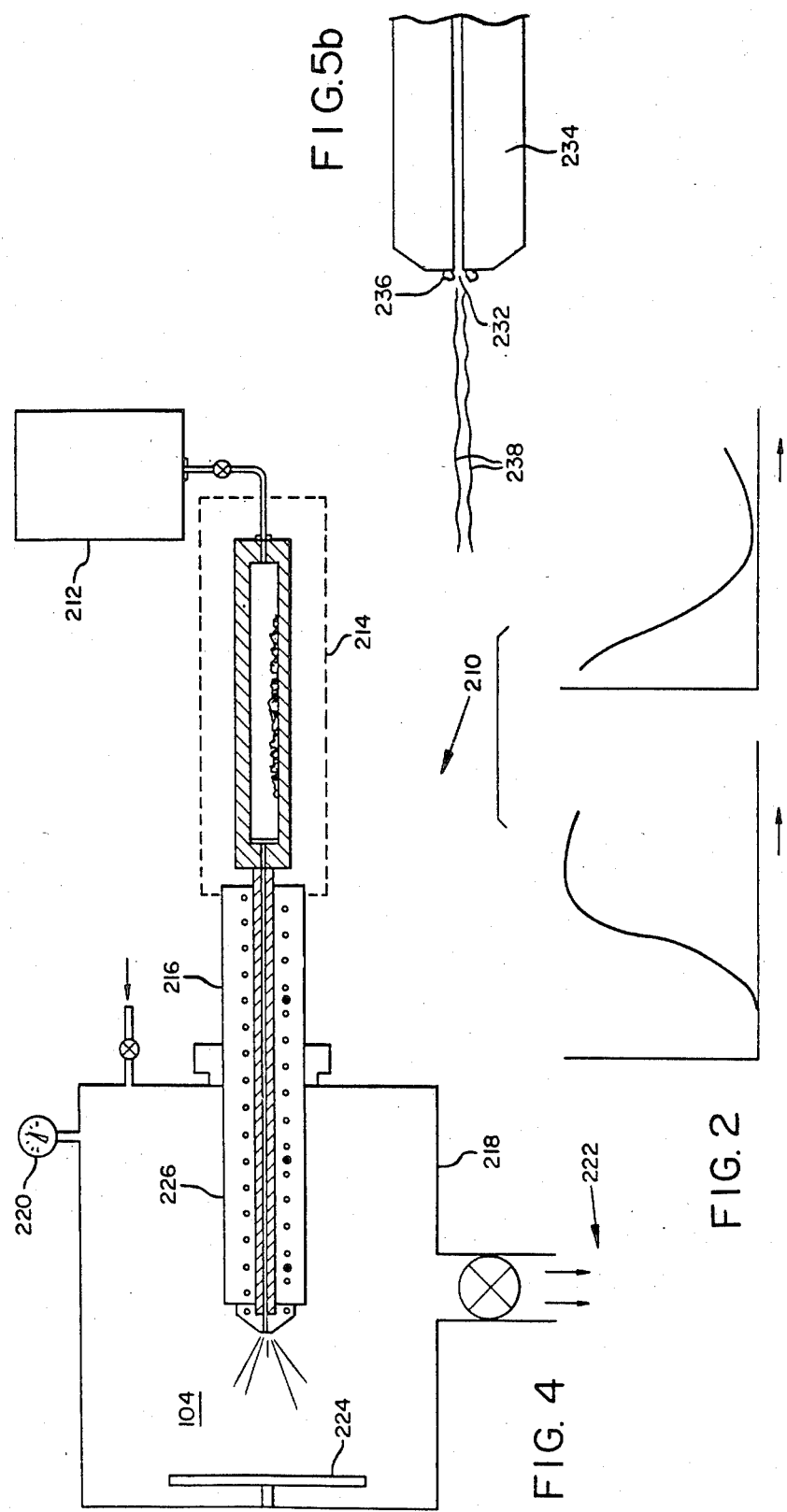

EXAMPLES OF FIMS DEPOSITED SURFACES

1 μm

EXAMPLES OF FIMS DEPOSITED PARTICLES

|—————|
10μm

EXAMPLES OF FIMS DEPOSITED PARTICLES $\underset{1\mu m}{\llcorner\quad\lrcorner}$

METHOD OF MAKING SUPERCRITICAL FLUID MOLECULAR SPRAY FILMS, POWDER AND FIBERS

RELATED APPLICATION DATA

This is a continuation-in-part of my copending application entitled SUPERCRITICAL FLUID MOLECULAR SPRAY FILM DEPOSITION AND POWDER FORMATION, Ser. No. 528,723, filed Sept. 1, 1983, now U.S. Pat. No. 4,582,731, patented Apr. 15, 1986.

BACKGROUND OF THE INVENTION

This invention relates to deposition and powder formation methods and more particularly to thin films and fine powders and fibers formation methods.

Thin films and methods for their formation are of crucial importance to the development of many new technologies. Thin films of less than about one micrometer ($\mu$m) thickness down to those approaching monomolecular layers, cannot be made by conventional liquid spraying techniques. Liquid spray coatings are typically more than an order of magnitude thicker than true thin films. Such techniques are also limited to deposition of liquid-soluble substances and subject to problems inherent in removal of the liquid solvent.

There are many existing technologies for thin films deposition, including physical and chemical vapor deposition, plasma pyrolysis and sputtering. Collectively, these techniques are usable to produce thin films of many materials for a wide variety of applications, but it is still impossible to generate suitable thin films of many materials, particularly for thermally labile organic and polymeric materials. Some of these known techniques enable deposition of thin films having physical and chemical qualities, such as molecular homogeneity, which are unattainable by liquid spray techniques. Existing thin film technologies are often also inadequate for many applications due to high power requirements, low deposition rates, limitations upon substrate temperature, or the complexity and expense of deposition equipment. Hence, such techniques cannot be used economically to produce thick films or coatings having the same qualities as thin films. Also, most known thin film deposition techniques are mutually incompatible.

Accordingly, a need remains for a new surface deposition technique, which has the potential of allowing deposition of thin films not previously possible, with distinct advantages compared to existing thin film technologies.

Similar problems and a similar need exists in the formation of fine powders. Highly homogeneous and very fine powders, such as made by plasma processing, are very energy intensive and therefore expensive to make.

SUMMARY OF THE INVENTION

One object of this invention is to enable deposition of very high- as well as low-molecular weight solid thin films or formation of powders thereof.

A second object is to deposit films or form fine powders of thermally-labile compounds.

A third object of the invention is to deposit thin films having a highly homogeneous microstructure.

Another object is to reduce the cost and complexity of apparatus for depositing thin films or forming powders.

A further object is to enable rapid deposition of coatings having thin film qualities.

Another object is the formation of fine powders having a narrow size distribution, and to enable control of their physical and chemical properties as a function of their detailed structure.

An additional object is the formation of fine powders with structures appropriate for use as selective chemical catalysts.

Yet another object is to enable deposition without excessively heating or having to cool or heat the substrate to enable deposition.

An additional object is to enable deposition of nonequilibrium materials.

The invention is a new technique for depositing thin films and forming fine powders utilizing a supercritical fluid injection molecular spray (FIMS). The technique involves the rapid expansion of a pressurized supercritical fluid (dense gas) solution containing the solid material or solute to be deposited into a low pressure region. This is done in such a manner that a "molecular spray" of individual molecules (atoms) or very small clusters of the solute are produced, which may then be deposited as a film on any given substrate or, by promoting molecular nucleation or clustering, as a fine powder. The range of potential application of this new surface deposition and powder formation technology is very broad.

The technique appears applicable to any material which can be dissolved in a supercritical fluid. In the context of this invention, the term "supercritical" relates to dense gas solutions with enhanced solvation powers, and can include near supercritical fluids. While the ultimate limits of application are unknown, it includes most polymers, organic compounds, and many inorganic materials (using, for example, supercritical water as the solvent). Polymers of more than one million molecular weight can be dissolved in supercritical fluids. Thin films and powders can therefore be produced for a wide range of organic, polymeric, and thermally labile materials which are impossible to produce with existing technologies. This technique also provides the basis for improved and considerably more economical methods for forming powders or depositing surface layers of a nearly unlimited range of materials on any substrate and at any desired thickness.

The FIMS film deposition and powder formation processes are useful for many potential applications and can provide significant advantages over prior techniques. For example, in the electro-optic materials area, improved methods of producing thin organic and polymer films are needed and are made possible by this invention. The process also appears to be useful for the development of resistive layers (such as polyimides) for advanced microchip development. These techniques can provide the basis for thin film deposition of materials for use in molecular scale electronic devices where high quality films of near molecular thicknesses will be required for the ultimate step in miniaturization. This approach also provides a method for deposition of thin films of conductive organic compounds as well as the formation of thin protective layers. A wide range of applications exist for deposition of improved coatings for UV and corrosion protection, and layers with various specialized properties. Many additional potential applications could be listed. Similarly, FIMS powder formation techniques can be used for formation of more selective catalysts or new composite and low density materials with a wide range of applications.

It is believed that this process will have substantial utility in space manufacturing applications, particularly using the high-vacuum, low-gravity conditions thereof. In space, this process would produce perfectly symmetric powders. Applications in space as well as on earth include deposition of surface coatings of a wide range of characteristics, and deposition of very thin adhesive layers for bonding and construction.

There are three fundamental aspects to the FIMS film deposition and powder formation process. The first aspect pertains to supercritical fluid solubility. Briefly, many solid materials of interest are soluble in supercritical fluid solutions that are substantially insoluble in liquids or gases. Forming a supercritical solution can be accomplished either of two ways: dissolving a solute or appropriate precursor chemicals into a supercritical fluid or dissolving same in a liquid and pressuring and heating the solution to a supercritical state. In accordance with the invention, the supercritical solution parameters—temperature, pressure, and solute concentration—are varied to control rate of deposition and molecular nucleation or clustering of the solute.

The second important aspect is the fluid injection molecular spray or FIMS process itself. The injection process involves numerous parameters which affect solvent cluster formation during expansion, and a subsequent solvent cluster "break-up" phenomenon in a Mach disk which results from free jet or supersonic expansion of the solution. Such parameters include expansion flow rate, orifice dimensions, expansion region pressures and solvent-solute interactions at reduced pressures, the kinetics of gas phase nucleation processes, cluster size and lifetime, substrate conditions, and the energy content and reactivity of the "nonvolatile" molecules which have been transferred to the gas phase by the FIMS process. Several of these parameters are varied in accordance with the invention to control solvent clustering and to limit or promote nucleation of the solute molecules selectively to deposit films or to form powders, respectively, and to vary granularity and other characteristics of the films or powders.

The third aspect of the invention pertains to the conditions of the substrate during the thin film deposition process. Briefly, all of the techniques presently available to the deposition art can be used in conjunction with this process. In addition, a wide variety of heretofor unavailable physical film characteristics can be obtained by varying the solution and fluid injection parameters in combination with substrate conditions.

The potential major advantages of the FIMS thin film deposition technique compared to conventional technologies such as sputtering and chemical vapor deposition (CVD) include:

Economic operation (compared to sputtering).

A wide range of readily controlled deposition rates.

Operation from high vacuum to atmospheric pressures.

Independence from substrate conditions and limitations (such as temperature) allowing improved control over film characteristics.

Deposition of organic and polymeric materials in thin films not possible by existing technologies.

Possible adaptation to small portable deposition devices for exotic applications.

Similar advantages arise from the FIMS powder formation method, in particular the ability to generate ultra fine powders, highly uniform size distributions, and uniform or amorphous chemical and physical properties.

I have discovered that the FIMS process can also be manipulated to produce extremely fine fibers having aspect ratios (ratios of length to diameter) of about 10 to more than one thousand, in some cases. Conventionally, polymeric fibers, e.g., of nylon or polyesters, are commonly produced by extrusion through a perforated plate known as a spinneret. The polymer, either molten or in solution, is forced through the perforations and the solvent, if one is used, is evaporated. The resulting fibers are approximately the same in diameter as the perforations and are continuous.

U.S. Pat. No. 3,981,957 to van Brederode et al. and U.S. Pat. No. 4,012,461 to van Brederode indicate that fibers or polymer strings have been made in prior art solvent-system powder-making processes. U.S. Pat. No. 3,981,957 teaches a method for making polymer powders by extruding a mixture of molten polymer and 10-50% liquid solvent through a nozzle having a central orifice diameter of 0.02 inches, and discharging a high-pressure gas through secondary orifices positioned radially around the central orifice to atomize the molten solute. Van Brederode et al. also indicate that this method can produce fibers at a temperature lower than that at which powder is produced. Both patents, however, view fibers as an undesirable product and neither discloses any sizes, physical or chemical characteristics, or utility of the fibers produced. Nor do these patents mention the use of supercritical fluids; the temperatures and pressures specified are intended to maintain the solvent in a predominantly liquid phase. No fiber dimensions are mentioned in these patents.

In contrast, useful fibers can be formed by the FIMS process with diameters of 0.1 $\mu$m to 5-10 $\mu$m, considerably smaller (typically by an order of magnitude) than that of the orifice, which can be in the range of 10 $\mu$m-100 $\mu$m in diameter. For example, one set of measurements for a restrictor with a 50 $\mu$m-diameter orifice gives 6 $\mu$m diameter fibers while a restrictor with a 10 $\mu$m-diameter orifice gives 1 $\mu$m diameter fibers. This process produces fine fibers of high uniformity. It is applicable for any polymer which can be melted, or mixed with a small amount of solvent to form a viscous liquid. It is particularly useful to produce fine fibers having commercial utility, such as polycarbosilane fibers.

The FIMS process is used to make fibers by modifying rapid expansion of a supercritical solution containing a polymer solute and an appropriate supercritical solvent, so that the solute passes briefly through an intermediate liquid phase, rather than directly to a solid, from the solution. One way to do this is to raise the solution temperature to just above the melting point of the solute. Another is to use a small amount (<20%) of a supercritical solvent modifier or entrainer having a higher critical temperature than the main solvent component and substantial solubility with the polymer, so as to form a viscous polymer solution during the expansion process and allowing the formation of fibers. Acetone provides a suitable such secondary solvent or co-solvent for many classes of polymers and others can be readily determined. The concentration of the secondary solvent should be sufficiently low that, upon expansion through the orifice and vaporization of the primary supercritical solvent, a transient low-viscosity solution of the polymer and secondary supercritical fluid solvent is formed within the nozzle. The latter technique is used with normally solid solutes that do not have appropriate melting points for use with a single supercritical solvent. In this method all components active in forming the fibers pass through a common nozzle; secondary atomizing-gas orifices are unneeded in Van Brederode et al. Additional nozzles can be used, however, each being a common nozzle for all solution components, to multiply fiber-production capacity.

The foregoing and other objects, features and advantages of the invention will become more readily apparent from the following detailed description, which proceeds with reference to the accompanying drawings.

BRIEF DESCRIPTION OF THE DRAWINGS

FIG. 2 is a graph of typical trends for solubilities of solids in supercritical fluids as a function of temperature and pressure.

FIG. 4 is a simplified schematic of apparatus for supercritical fluid injection molecular spray deposition of thin films on a substrate or formation of powders in accordance with the invention.

FIG. 5B is an enlarged, simplified diagram of the injector of FIG. 5 showing diagrammatically the production of very fine fibers.

DETAILED DESCRIPTION

The immediately following sections describe, in turn, the relevant aspects of supercritical fluid behavior, the FIMS process, and film deposition and powder formation using the process. These are followed by descriptions of apparatus used in the process and examples of the process and the resultant products. Various background references are cited parenthetically in this description, are listed in the appended bibliography and are incorporated by reference herein to further explain to practitioners of the thin film deposition and powder formation arts certain details of the present invention with which they presently are not ordinarily familiar.

SOLUBILITIES IN SUPERCRITICAL FLUIDS

The primary requirement for the Fluid Injection Molcular Spray (FIMS) technique is that the material to be deposited (or a suitable precursor) be soluble in a supercritical fluid. Subsequently in the process, the supercritical fluid or solvent is one which substantially vaporizes into a gas upon expansion from the supercritical state, enabling removal from the vicinity of deposition.

Because of its importance to the FIMS powder and film deposition technique, and the present lack of solubility data for many substances of interest, a brief discussion of relevant supercritical fluid phenomena is warranted.

At high pressures above the critical point the resulting fluid or "dense gas" will attain densities approaching those of a liquid (with increased intermolecular interactions) and will assume some of the properties of a liquid. The supercritical fluid extraction (1) and supercritical fluid chromatography (2) methods utilize the variable but readily controlled properties characteristic of a supercritical fluid. These properties are dependent upon the fluid composition, temperature, and pressure.

Figure 1:
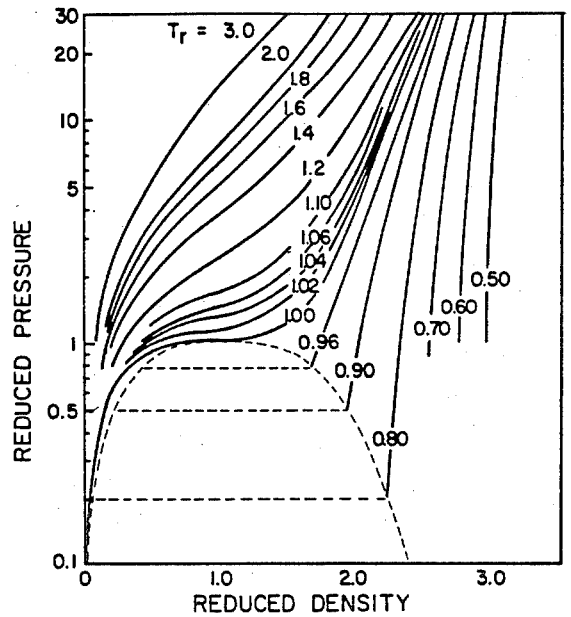
FIG. 1 is a graph of a typical pressure-density behavior for a compound in the critical region in terms of reduced parameters.

The compressibility of supercritical gases is great, just above the critical temperature where small changes in pressure result in large changes in the density of the supercritical fluid (3). FIG. 1 shows a typical pressure-density relationship in terms of reduced parameters (e.g., pressure, temperature or density divided by the corresponding variable at the critical point, which are given for a number of compounds in Table 1). Isotherms for various reduced temperatures show the variations in density which can be expected with changes in pressure. The "liquid-like" behavior of a supercritical fluid at higher pressures results in greatly enhanced solubilizing capabilities compared to those of the "subcritical" gas, with higher difusion coefficients and an extended useful temperature range compared to liquids (4). Compounds of high molecular weight can often be dissolved in the supercritical phase at relatively low temperatures; and the solubility of species up to 1,800,000 molecular weight has been demonstrated for polystyrene.

An interesting phenomenon associated with supercritical fluids is the occurrence of a "threshold pressure" for solubility of a high molecular weight solute (4). As the pressure is increased, the solubility of the solute will often increase by many orders of magnitude with only a small pressure increase (2). Thus, the threshold pressure is the pressure (for a given temperature) at which the solubility of a compound increases greatly (i.e., becomes detectable). Examples of a few compounds which can be used as supercritical solvents are given in Table 1.

TABLE 1

| EXAMPLES OF SUPERCRITICAL SOLVENTS | | | | |
| --- | --- | --- | --- | --- |
| Compound | Boiling Point (° C.) | Critical Temperature (° C.) | Critical Pressure (atm) | Critical Density (g/cm³) |
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |

TABLE 1-continued
EXAMPLES OF SUPERCRITICAL SOLVENTS

| Compound | Boiling Point (° C.) | Critical Temperature (° C.) | Critical Pressure (atm) | Critical Density (g/cm$^3$) |
|---|---|---|---|---|
| Propane | −42.1 | 96.67 | 41.9 | 0.217 |
| Pentane | 36.1 | 196.6 | 33.3 | 0.232 |
| Benzene | 80.1 | 288.9 | 48.3 | 0.302 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | 31.2 | 28.0 | 38.7 | 0.579 |
| Monofluoromethane | 78.4 | 44.6 | 58.0 | 0.3 |
| Toluene | 110.6 | 320.0 | 40.6 | 0.292 |
| Pyridine | 115.5 | 347.0 | 55.6 | 0.312 |
| Cyclohexane | 80.74 | 280.0 | 40.2 | 0.273 |
| m-Cresol | 202.2 | 433.0 | 45.0 | 0.346 |
| Decalin | 195.65 | 391.0 | 25.8 | 0.254 |
| Cyclohexanol | 155.65 | 356.0 | 38.0 | 0.273 |
| o-Xylene | 144.4 | 357.0 | 35.0 | 0.284 |
| Tetralin | 207.57 | 446.0 | 34.7 | 0.309 |
| Aniline | 184.13 | 426.0 | 52.4 | 0.34 |

Near supercritical liquids demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some compounds. These variations are considered to be within the concept of a supercritical fluid as used in the context of this invention.

The fluid phase solubility of higher molecular weight and more polar materials is a necessary prerequisite for many potentially important FIMS applications. Unfortunately, the present state of theoretical prediction of fluid phase solubilities is inadequate to serve as a reliable guide to fluid selection. Various approaches to solubility prediction have been suggested or employed. Some of these approaches have been reviewed by Irani and Funk (5). The rigorous theoretical approach is to use the virial equation-of-state and calculate the necessary virial coefficients using statistical mechanics. However, the virial equation-of-state does not converge as the critical density is approached (5). Since its application is generally limited to densities of less than half the critical density, it is inadequate for FIMS conditions. Consequently, at higher solvent densities, an empirical or semi-empiricial equation-of-state must be employed. While both equations-of-state and lattice gas models have been applied to fit supercritical fluid solubility data (6–13), this approach at present is of limited value for polar components and larger organic compounds (14,15).

An alternative approach which uses the more empirically derived solubility parameters can be modified to be an appropriate guide for fluid selection (16,17). This approach has the advantage of simplicity, but necessarily involves approximations due to an inadequate treatment of density-dependent entropy effects, pressure-volume effects, and other approximations inherent in solution theory, as well as failures such as those noted for the theoretical methods. More recent approaches, designed to take into consideration the range of attractive forces, have utilized multidimensional solubility parameters which are evaluated by more empirical methods (18). In contrast to liquids, the solubility parameter of a supercritical fluid is not a constant value, but is approximately proportional to the gas density. In general, two fluid components are considered likely to be mutually soluble if the component solubility parameters agree to within ±1 (cal/cm$^3$). However, actual supercritical fluid solubilities are usually less than predicted (17). The solubility parameter may be divided into two terms related to "chemical effects" and intermolecular forces (16,17). This approach predicts a minimum density below which the solute is not soluble in the fluid phase (the "threshold pressure"). It also suggests that the solubility parameter will have a maximum value as density is increased if sufficiently high solubility parameters can be obtained. This phenomenon has been observed for several compounds in very high pressure studies (17).

The typical range of variation of the solubility of a solid solute in a supercritical fluid solvent as a function of temperature and pressure is illustrated in a simplified manner in FIG. 2. The solute typically exhibits a threshold fluid pressure above which solubility increases significantly. The region of maximum increase in solubility has been predicted to be near the critical pressure where the change in density is greatest with pressure (see FIG. 1) (18). In contrast, where volatility of the solute is low and at lower fluid pressures, increasing the temperature will typically decrease solubility as fluid density decreases. Howeever, as with many liquids, "solubility" may again increase at sufficiently high temperatures, where the solute vapor pressure may also become significant. Thus, while the highest supercritical fluid densities at a given pressure are obtained near the critical temperature, higher solubilities may be obtained at slightly lower fluid densities but higher temperatures.

Figure 3:
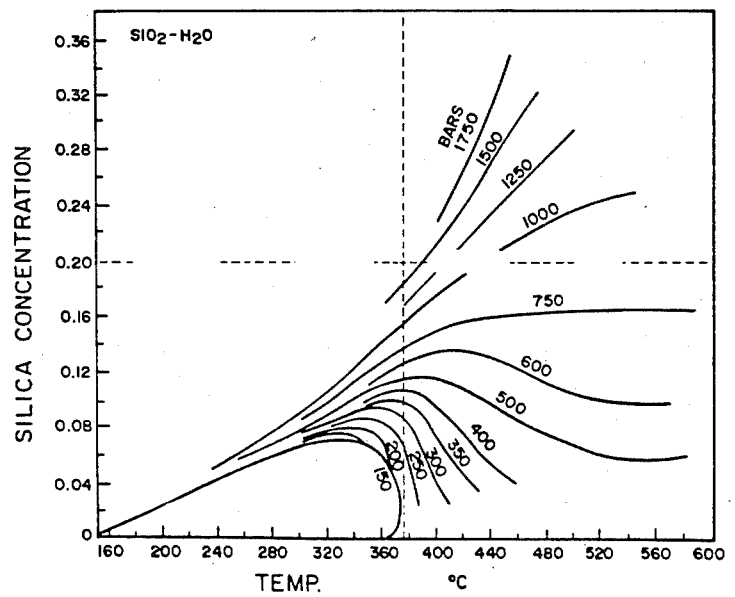
FIG. 3 is a graph of the solubility of silicon dioxide ($SiO_2$) in subcritical and supercritical water at various pressures.

While there is little data concerning the solubility of many materials relevant to the FIMS film deposition, some systems have been extensively investigated due to their importance in other fields of technology (19–23). As an example, FIG. 3 gives solubility data for silicon dioxide ($SiO_2$) in subcritical and supercritical water, illustrating the variation in solubility with pressure and temperature. The variation in solubility with pressure provides a method for both removal or reduction in impurities, as well as simple control of FIMS deposition rate. Other possible fluid systems include those with chemically-reducing properties, or metals, such as mercury, which are appropriate as solvents for metals and other solutes which have extremely low vapor pressures. Therefore, an important aspect of the invention is the utilization of the increased supercritical fluid solubilities of solid materials for FIMS film deposition and powder formation.

FLUID INJECTION MOLECULAR SPRAY

The fundamental basis of the FIMS surface deposition and powder formation process involves a fluid expansion technique in which the net effect is to transfer a solid material dissolved in a supercritical fluid to the gas phase at low (i.e., atmospheric or subatmospheric) pressures, under conditions where it typically has a negligible vapor pressure. This process utilizes a fluid injection technique which calls for rapidly expanding the supercritical solution through a short orifice into a relatively lower pressure region, i.e., one of approximately atmospheric or subatmospheric pressures. This technique is akin to an injection process, the concept of which I recently developed, for direct analysis of supercritical fluids by mass spectrometry (24–28). However, it differs from the spectrometry application in that the latter is limited to expansion into regions of well-defined pressure of about 1 torr., very low flow rates—less than about 100 microliters/min.—and very dilute solute concentrations, and injection into an ion plasma, rather than an energetically passive low-pressure region. An understanding of the physical and chemical phenomena during the FIMS process is vital to the deposition of films and formation of films with desirable properties.

The design of the FIMS orifice (or pressure restrictor) is a critical factor in overall performance. The FIMS apparatus should be simple, easily maintained and capable of prolonged operation without failure (e.g., plugging of the restrictor). Additionally, the FIMS process for thin film applications must be designed to provide for control of solute clustering or nucleation, minimization of solvent clusters, and to eliminate or reduce the condensation or decomposition of nonvolatile or thermally labile compounds. Similarly, solute clustering, nucleation and coagulation are utilized to control the formation of fine powders using the FIMS process. The ideal restrictor or orifice allows the entire pressure drop to occur in a single rapid step so as to avoid the precipitation of nonvolatile material at the orifice. Proper design of the FIMS injector, discussed hereinafter, allows a rapid expansion of the supercritical solution, avoiding the liquid-to-gas phase transition.

The unique characteristics of the FIMS process, as contrasted to deposition by liquid spray or nebulization, center about the direct fluid injection process. In liquid nebulization the bulk of the spray is initially present as droplets of about micron size or larger. Droplets of this size present the problem of providing sufficient heat to evaporate the solvent. This is impractical in nearly all cases. Thus spray and nebulization methods are not true thin film techniques since relatively large particles or agglomerations of molecules actually impact the surface. These same characteristics also enable the production of much finer powders using FIMS than are practical by techniques not involving gas phase particle growth.

Additional advantages result from the much higher volatility of many supercritical fluids compared to liquid spray or nebulization techniques. This allows the solvent to be readily pumped away or removed since there is little tendency to accumulate on the surface. Typical conditions in the liquid spray or nebulization techniques result in extensive cluster formation and persistence of a jet of frozen droplets into the low pressure discharge region. A characteristic of the FIMS process is that, during fluid injection at low flow rates, there is no visible jet formation once the critical temperature has been exceeded. At high flow rates and a supercritical solution temperature such that for a reduced temperature $T_R$ of under about 1.3 at pressures of about three times critical pressure of the solvent, the jet becomes visible.

Thermodynamic considerations for an isentropic expansion, such as the FIMS process, lead one to expect less than a few percent of the solvent to be initially present as clusters. Proper control of conditions during the FIMS process results in an extremely short lifetime for these small clusters above $T_R \approx 1.3$. Solvent clusters are rapidly reduced in size due to both evaporation and by the heating process due to the Mach disk shock front, described below. Clusters or small particles of the "solute" can be avoided by having sufficiently dilute supercritical solutions, operating in a temperature range above the critical temperature for the solvent, and expanding under conditions which minimize the extent of nucleation or agglomeration. On the other hand, small solute particle or powder formation can be maximized by having high solute concentrations and injection flow rates leading to both clusters with large numbers of solute molecules and increased gas phase nucleation and coagulation processes. The latter conditions can produce a fine powder, having a relatively narrow size distribution, with many applications in materials technologies.

Figure 6:
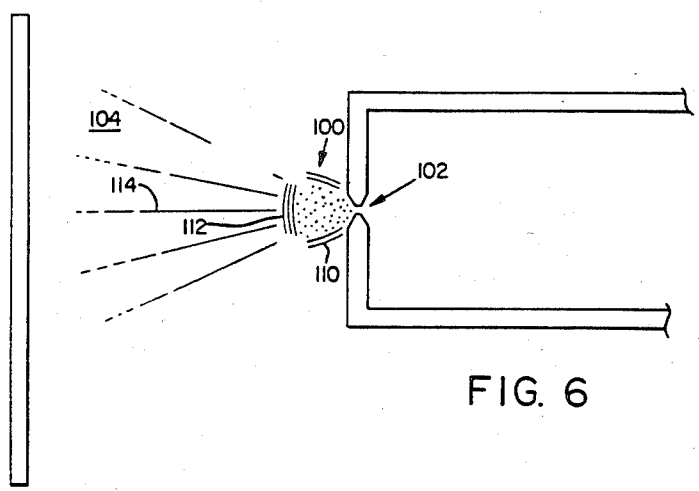
FIG. 6 is a schematic illustration of the fluid injection molecular spray process illustrating the interaction of the supercritical fluid spray with the low pressure region into which it is injected.

An improved understanding of the FIMS process may be gained by consideration of solvent cluster formation phenomena during isentropic expansion of a high pressure jet 100 through a nozzle 102, as illustrated schematically in FIG. 6. The expansion through the FIMS orifice 102 is related to the fluid pressure ($P_f$), the pressure in the expansion region ($P_v$), and other parameters involving the nature of the gas, temperature, and the design of orifice 102. When an expansion occurs in a low pressure region or chamber 104 with a finite background pressure ($P_v$), the expanding gas in jet 100 will interact with the background gas producing a shock wave system. This includes barrel and reflected shock waves 110 as well as a shock wave 112 (the Mach disk) perpendicular to the jet axis 114. The Mach disk is created by the interaction of the supersonic jet 110 and the background gases of region 104. It is characterized by partial destruction of the directed jet and a transfer of collisional energy resulting in a redistribution of the directed kinetic energy of the jet among the various translational, vibrational and rotational modes. Thus, the Mach disk serves to heat and break up the solvent clusters formed during the expansion process. Experimentally, it has been observed that the extent of solvent cluster formation drops rapidly as pressure in the expansion region is increased. This pressure change moves the Mach disk closer to the nozzle, curtailing clustering of the solvent.

The distance from the orifice to the Mach disk may be estimated from experimental work (29,30) as $0.67D(P_f/P_v)^{\frac{1}{2}}$, where D is the orifice diameter. Thus, for typical conditions where $P_f=400$ atm, $P_v=1$ torr and $D=1$ $\mu$m the distance to the Mach disk is 0.4 mm. Accordingly, it is necessary to have sufficient background gas in the low pressure region to limit clustering of the solvent so that the solvent is not included in the film or powder. This constraint is met in any practical enclosed vacuum system.

The solvent clusters formed during the expansion of a dense gas result from adiabatic cooling in first stages of the expansion process. The extent of cluster formation is related to the fluid pressure, temperature, and the orifice dimensions. Theoretical methods for prediction of the precise extent of cluster formation are still inadequate. However, an empirical method of "corresponding jets" has been developed (29) which uses scaled parameters, and has been successfully employed. Randall and Wahrhaftig (30) have applied this method to the expansion of supercritical $CO_2$ and obtained the following empirical equation:

$$N = 6 \times 10^{11} \times P_f^{1.44} \times D^{0.86} \times T^{-5.4}$$

for $P_f$ in torr, T in °K., D in mm and where N is the average number of molecules in a cluster and T is the supercritical fluid temperature. For the typical conditions noted above this leads to an average cluster size of approximately $1.6 \times 10^3$ molecules at 100° C. or a droplet diameter of about 30 Å. For a solute present in a 1.0 mole percent supercritical fluid solution, this corresponds to a solute cluster size of 16 molecules after loss or evaporation of the solvent (gas) molecules, assuming all solute molecules remain associated. For the laser drilled FIMS orifice, the dimensions are such that we expect somewhat of a delay in condensation resulting in a faster expansion and less clustering than calculated. More conventional nozzles or longer orifice designs would enhance solvent cluster formation.

Thus, the average clusters formed in the FIMS expansion process are more than $10^6$ to $10^9$ less massive than the droplets formed in liquid spray and nebulization methods. The small clusters formed in the FIMS process are expected to be rapidly broken up in or after the Mach disk due to the energy transfer process described above. The overall result of the FIMS process is to produce a gas spray or a spray of extremely small clusters incorporating the nonvolatile solute molecules. This conclusion is supported by our mass spectrometric observations which show no evidence of cluster formation in any of the supercritical systems studied to date (25,26).

Thus, the foregoing details of the FIMS process are relevant to the injector design, performance, and lifetime, as well as to the characteristics of the molecular spray and the extent of clustering or coagulation. The initial solvent clustering phenomena and any subsequent gas phase solute nucleation processes, are also directly relevant to film and powder characteristics as described hereinafter.

Figure 10A:
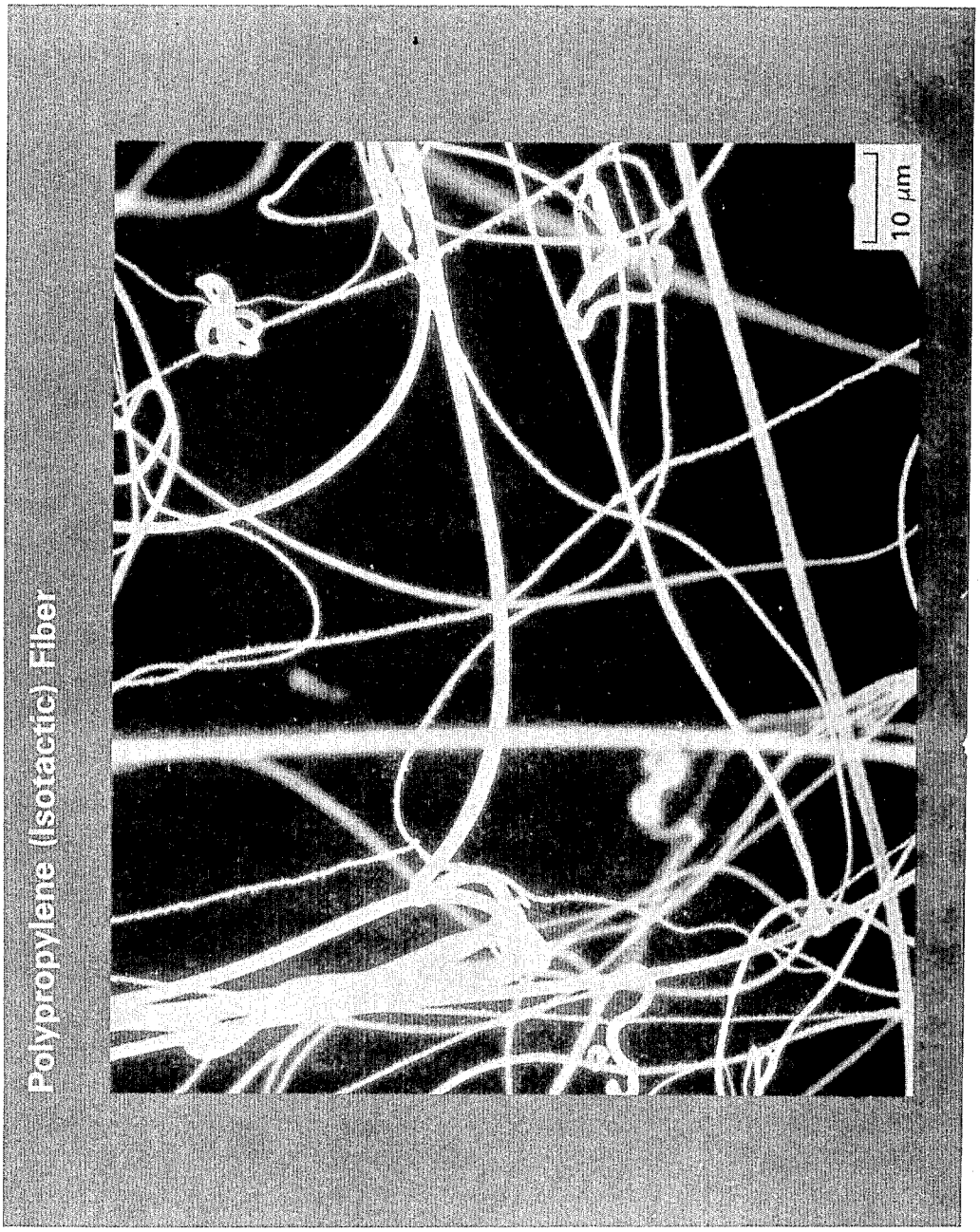
FIGS. 10A and 10B are photomicrographs of polypropylene fibers (scale indicated on FIG. 10A)
Figure 10B:
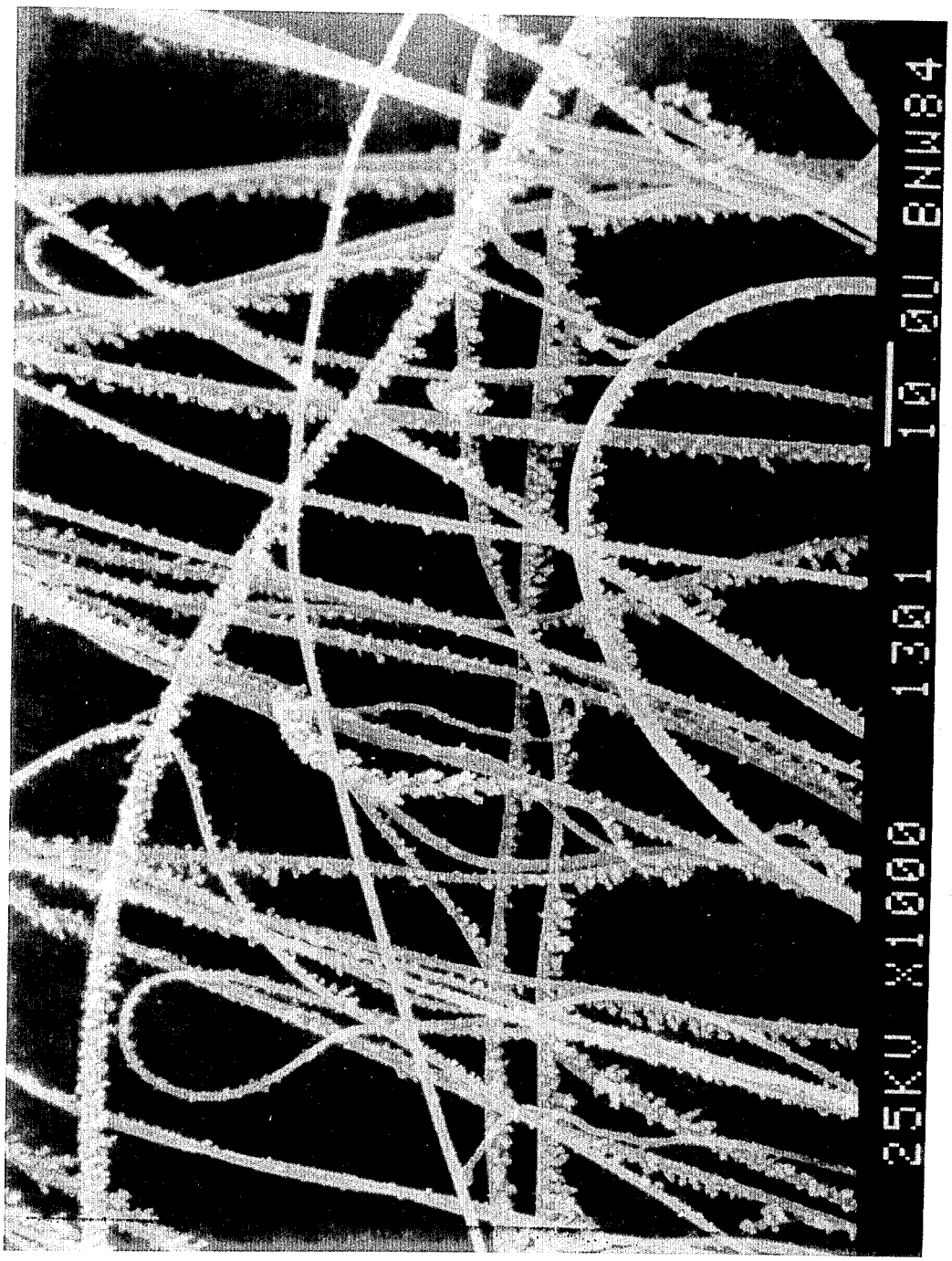
Figure 10C:
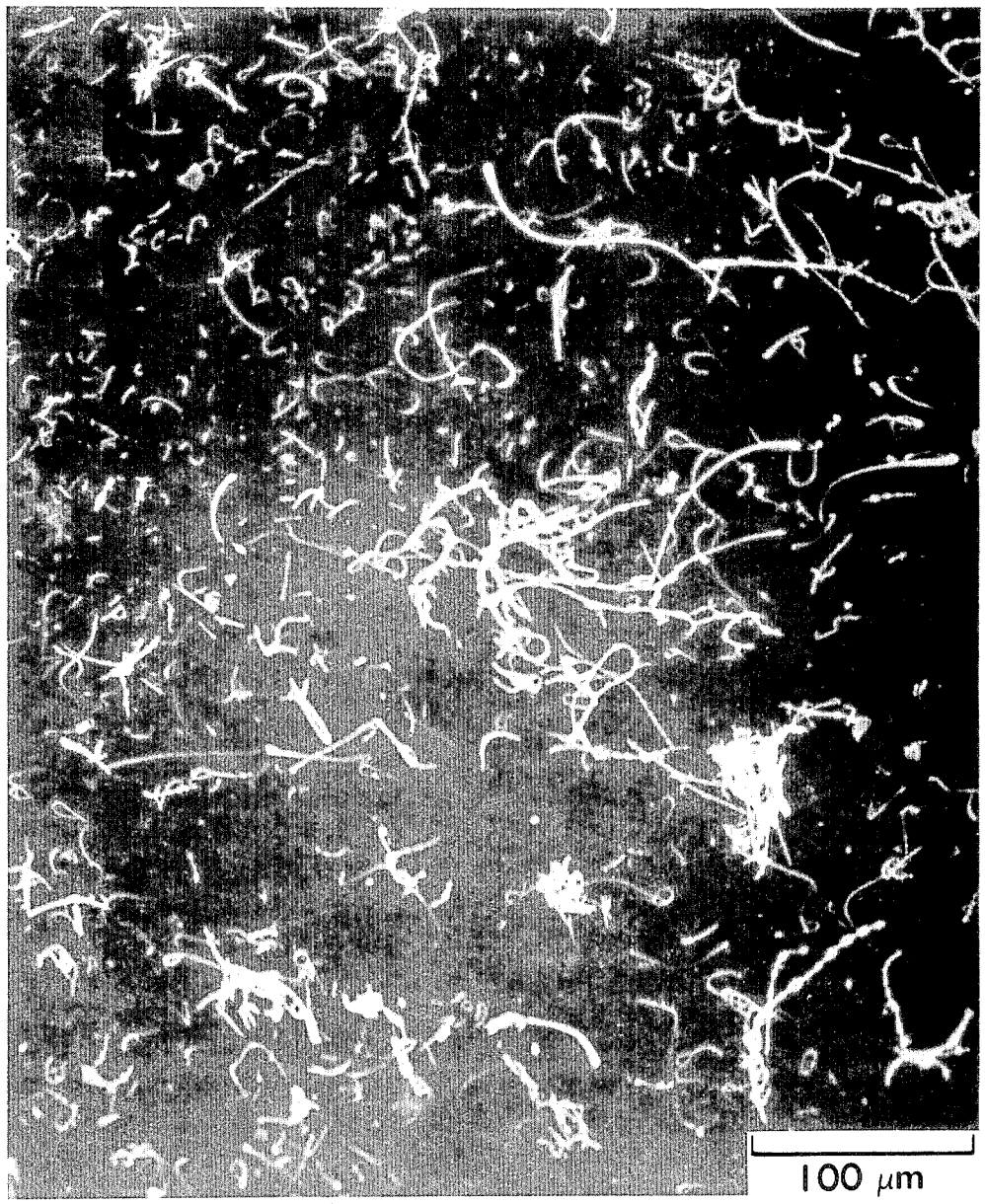
FIG. 10C is a photomicrograph of polycarbosilane fibers (scale indicated) made by a variation of the process of the invention.

In the fiber-making mode of operation, it is apparent that the above-described break-up phenomenon does not materially disrupt fiber-formation. Referring to FIG. 10B, however, it also appears that there is a mixed fiber/powder-making mode, in which the break-up phenomenon may play a role.

FILM DEPOSITION AND POWDER FORMATION

The FIMS process is the basis of this new thin film deposition and powder formation technique. The FIMS process allows the transfer of nominally nonvolatile species to the gas phase, from which deposition is expected to occur with high efficiency upon available surfaces.

However, while the FIMS process determines the rate of transfer to the gas phase, both the gas phase and substrate conditions have an effect upon the resulting film. The powder formation process also depends on both the FIMS process and the kinetics of the various gas phase processes which promote particle growth. The major gas phase processes include possible association with solvent molecules and possible nucleation of the film species (if the supercritical fluid concentration is sufficiently large). Important variable substrate parameters include distance from the FIMS injector, surface characteristics of the substrate, and temperature. Deposition efficiency also depends in varying degrees upon surface characteristics, pressure, translational energy associated with the molecular spray, and the nature of the particular species being deposited.

APPARATUS

Figure 4A:
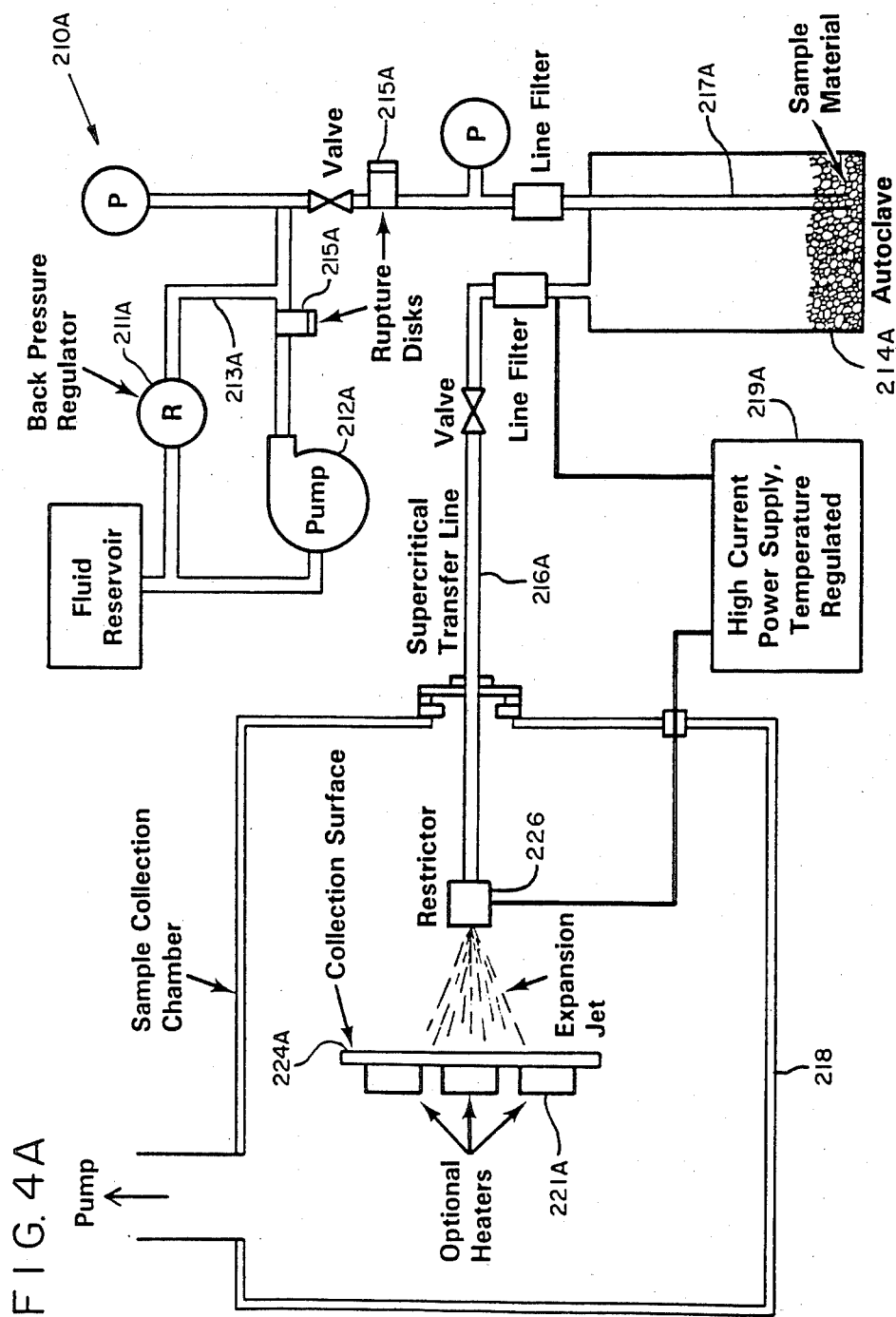
FIG. 4A is an alternative embodiment of the apparatus of FIG. 4.
Figure 5A:
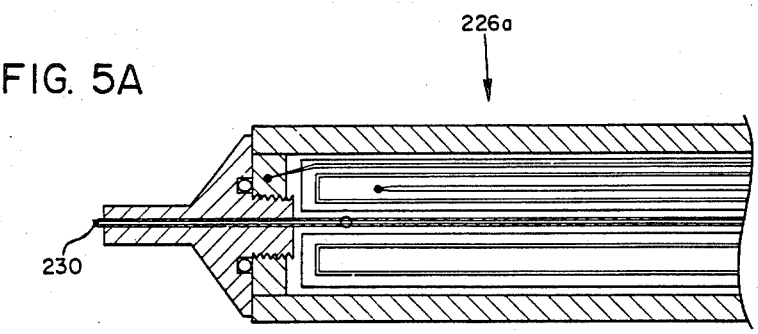
FIGS. 5 and 5A are enlarged cross sectional views of two different forms of supercritical fluid injectors used in the apparatus of FIG. 4.
Figure 5:
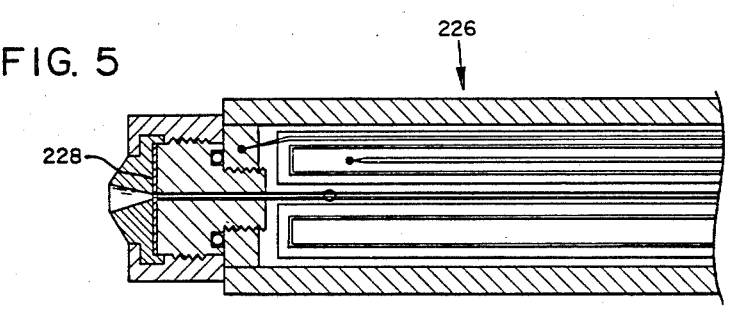

The viability of the FIMS concept for film deposition and powder formation has been demonstrated by the use of the apparatus shown in FIGS. 4, 5, and 5a. The supercritical fluid apparatus 210 utilizes a Varian 8500 high-pressure syringe pump 212 (8000 psi maximum pressure) and a constant-temperature oven 214 and transfer line 216. An expansion chamber 218 is equipped with a pressure monitor in the form of a thermocouple gauge 220 and is pumped along a 10 cfm mechanical pump 222. The chamber pump need not be used with atmospheric pressure collection of films or fibers. A liquid nitrogen trap (not shown) is used to prevent most pump oil from back streaming. (However, the films produced did show impurities in several instances due to the presence of a fluorocarbon contaminant and trace impurities due to the pump oil, and high quality films free of such impurities should utilize either improved pumping devices or a significant flow of "clean" gas to prevent back diffusion of pump oils.) The initial configuration also required manual removal of a flange for sample substrate 224 placement prior to flange closure and chamber evacuation. The procedure is reversed for sample removal. Again an improved system would allow for masking of the substrate until the start of the desired exposure period, and would include interlocks for sample introduction and removal. In addition, means (not shown) for substrate heating and sample movement (e.g., rotation) are also desirable for control of deposition conditions and to improve deposition rates (and film thicknesses) over large substrate areas. In addition, for certain powder or film products, it is appropriate to operate under ambient atmospheric conditions, thus greatly reducing the complexity of the necessary equipment. For ambient pressure deposition, one would simply need to maintain gas flow to remove the gas (solvent). If the fluid is a gas at the collection temperature, then no other gas flow or pumping is required.

An alternative, and presently preferred, FIMS deposition apparatus 210A is shown in FIG. 4A. This system utilizes a high pressure hydraulic piston pump 212A with a distancing piece (not shown) to prevent contamination of the pumped fluid by oil present in the air drive section. The pump is capable of maintaining 15,000 psi continuous pressure in the system. A back-pressure regulator 211A and rupture disks 213A in the outlet line are incorporated in the system in a feedback line 213A between the pump's intake and outlet lines to prevent overpressurization. The solid sample material is contained in a 280 ml high pressure autoclave 214A in which the high pressure input line 217A has been extended to the bottom to maximize dissolution of the sample. Temperature of the autoclave is maintained by an external band heater (not shown) and controlled using a thermocouple feedback. Heating of the transfer line 216A connecting the autoclave to the expansion nozzle 227 inside chamber 218 is achieved by applying the output from a temperature controlled high current, low voltage D.C. power supply 219A along its length. Heaters 221A are optionally mounted on the back of collection plate 224A.

Operation under the high vacuum conditions in space would allow desirable conditions for both the powder and thin films processes since the gas phase solvent is rapidly removed. In addition, the gravity-free conditions available in space would allow the formation of fine particles having highly symmetric physical properties. In addition, any FIMS process system would benefit from a number of FIMS injectors operating in tandem to produce more uniform production of powders or films or to inject different materials to produce powder and films of variable chemical composition.

Several FIMS probes have been designed and tested in this process. One design, illustrated in FIG. 5, consists of a heated probe 226 (maintained at the same temperature as the oven and transfer line) and a pressure restrictor consisting of a laser-drilled orifice in a 50 to 250 μm thick stainless steel disc 228. A small tin gasket is used to make a tight seal between the probe tip and the pressure restrictor, resulting in a dead volume estimated to be on the order of 0.01 microliter. Good results have been obtained with laser-drilled orifices in ~250 μm (0.25 mm) thick stainless steel. The orifice is typically in the 1-4 μm diameter size range for powder and film production, although this range is primarily determined by the desired flow rate. Larger orifices may be used and, for similar solute concentrations, will increase the extent of nucleation during the FIMS expansion. Larger orifices, ordinarily in the range of 10 μm to 100 μm, will be used for the production of fibers. The actual orifice dimensions are variable due to the laser drilling process. A second design (FIG. 5a) of probe 226a is similar to that of FIG. 5, but terminates in a capillary restriction obtained, for example, by carefully crimping the terminal 0.1-0.5 mm of platinum-iridium tubing 230. This design provides the desired flow rate as well as an effectively zero dead volume, but more sporadic success than the laser-drilled orifice. Another restrictor (not shown) is made by soldering a short length (<1 cm) of tubing having a very small inside diameter (<200 μm for a small system but potentially much larger for large scale film deposition or high powder formation rates) inside of tubing with a much larger inside diameter so that it acts as an orifice or nozzle. Also, a short length of fused silica capillary tubing can be used as the nozzle. Capillary arrays, produced similar to fiber optic arrays, can be used when multiple nozzles are required for greater production rates.

The important point is to enable the injection process to be sufficiently fast so that material has insufficient time to precipitate and plug the orifice. Thus a 10 cm length of 10 μm I.D. tubing plugs very rapidly—the pressure drops along the capillary and at some point the solute precipitates and collects, ultimately plugging the tube. In making films or powders, it is important to minimize any precipitation by making the pressure drop as rapid as possible. A simple calculation shows that the fluid moves through a restrictor of 100 μm in length in $<10^{-6}$ seconds.

Very concentrated (saturated) solutions can also be handled with reduced probability of plugging by adjusting the conditions in the probe so that the solvating power of the fluid is increased just before injection. This can be done in many cases by simply operating at a slightly lower or higher temperature, where the solubility is larger, and depending upon pressure as indicated in FIG. 2.

For production of films and powders, the aspect ratio (length/diameter) of the nozzle, for typical operating pressures, should be less than 1000. For production of fibers, a greater aspect ratio can be used, e.g., over 1000. Shorter nozzles (e.g., aspect ratio=400) can be used for making fibers but lower solution pressures or higher solute concentrations must then be used to precipitate the solute as a liquid within the nozzle.

FIG. 5B shows diagrammatically the formation of fibers by the FIMS process. A solution of a polymer in a supercritical solvent is ejected through capillary orifice 232 in a heated probe 226. The supercritical solution and the nozzle region of the probe are maintained at temperatures above the melting point of the polymer and the critical point of the solvent. Upon discharge from the orifice, the polymer solute has been observed (through a microscope) to collect, in many instances, in liquid droplets 236 on the end of capillary nozzle 226. Intermittently, these droplets are torn off by the continuous jet of gaseous solvent from orifice 232, forming fibers 238. It is uncertain from visual observations, however, whether fibers form only from polymer accumulation at the tip of the probe or if fibers also form from polymer which might first accumulate on the inside of the capillary tube. Nevertheless, it is believed that the polymer initially precipitates out of solution within the tube. Fibers formed by this process are much smaller in diameter than the orifice. Although it is possible to form fibers by flowing a molten polymer over the end of the capillary orifice, discharging a gas, as in van Brederode, the conversion efficiencies, size, distribution, and quality of the product was poor compared to van Brederode.

While the temperature of the probe must be above the melting point of the polymer it should be fairly close to that temperature. It has been found that, if the probe is too hot or too cold, powders are formed. It may be that the tiny streams of polymer collapse due to surface tension before they cool to the solid state, or that a limited range of polymer viscosity is required to elongate the fiber form without break-up in the high shear region. Collection too close to the tip degrades fiber quality, apparently due to the polymer being in a still somewhat fluid form. The supercritical fluid serves in this process both as a feed mechanism for the polymer fiber precursor material in a steady, constant and continuous fashion to the capillary orifice and to provide a gas jet through the same orifice which produces the necessary shear forces to elongate and cool the viscous liquid polymer to form a fiber.

Another parameter affecting the production of fibers is solution pressure. At very high solution pressures the polymer solute will remain in solution to nearer the end (exit) of the capillary nozzle. At lower pressures the solute drops out of the supercritical solution before the end of the nozzle and, if the local temperature is above the polymer melting point, can lead to fiber production. If temperatures are below the fiber melting point the nozzle will plug or produce large irregularly shaped particles. At higher pressures fine uniform powders will be produced.

EXAMPLES 1 AND 2

The two systems chosen for demonstration involved deposition of polystyrene films on platinum and fused silica, and deposition of silica on platinum and glass. The supercritical solution for polystyrene involved a 0.1% solution in a pentane −2% cyclohexanol solution. Supercritical water containing ~0.02% $SiO_2$ was used for the silica deposition. In both cases the substrate was at ambient temperatures and the deposition pressure was typically approximately 1 torr, although some experiments described hereinafter were conducted under atmospheric pressure. The films produced ranged from having a nearly featureless and apparently amorphous structure to those with a distinct crystalline structure. It should be noted that, as in chemical vapor deposition, control over film characteristics—amorphous, polycrystalline and even epitaxial in some instances—is obtained by control of the substrate surface and temperature). Relatively even deposition was obtained over the small surfaces (~4 cm²).

Fourier transform infrared analysis of the polystyrene films on fused silica (not shown) did not show detectable amounts of the cyclohexanol solvent. However, the silica films did show evidence of fluorocarbon impurities possibly due to the sample cell. Analysis of the films indicated a thickness of approximately 0.5 μm for polystyrene and 2800 Å for silica for five minute deposition periods. Much greater or smaller formation rates can be obtained by adjustment of parameters noted previously and the use of multiple FIMS injectors.

These limited studies also indicated that more concentrated solutions with long distances to the deposition surface could result in substantial nucleation and coagulation for some materials. For example, for silica, it was possible to generate an extremely fine powder having a complex structure and an average particle size <0.1 μm. Using a saturated polystyrene solution produced particles (not shown) as large as 0.3 μm with an extremely narrow size distribution.

The range of surface structures produced for the silica deposition studies show an even wider range of surface characteristics. FIGS. 7A, 7B, 7C and 7D give scanning electron photomicrographs obtained for silica film deposition on glass surface under the range of conditions listed in Table 2 below.

TABLE 2

| Solute: Silica | | | Solvent: Water | |
|---|---|---|---|---|
| Expansion region at ambient temperature for 5–10 minutes exposed. | | | | |
| Supercritical Fluid | | | FIMS Conditions | |
| Silica Conc. Est. from Solubility Data | Temp | Pressure (atm) | Flow Rate | Pressure |
| Film | | | | |
| A | 0.01% | 450° C. | 400 | 40 microliter/min | 5 torr |
| B | 0.02% | 400° C. | 450 | 40–70 microliter/min | 0.5 torr |
| C | 0.04% | 490° C. | 400 | 150 microliter/min | 0.6 torr |
| D* | 0.04% | 450° C. | 400 | 250 microliter/min | 0.9 torr |
| Powder | | | | |
| A | 0.02% | 520° C. | 450 | 100 microliter/min | 1 atm (760 torr) |
| B* | 0.05% | 450° C. | 400 | 90 microliter/min | 0.5 torr |
| C | 0.04% | 450° C. | 400 | 300 microliter/min | 1.2 torr |

*Contained fluorocarbon contaminant

Figure 7A:
FIGS. 7A, 7B, 7C and 7D are photomicrographs showing four different examples of supercritical fluid injection molecular spray-deposited silica surfaces in accordance with the invention.
Figure 7B:
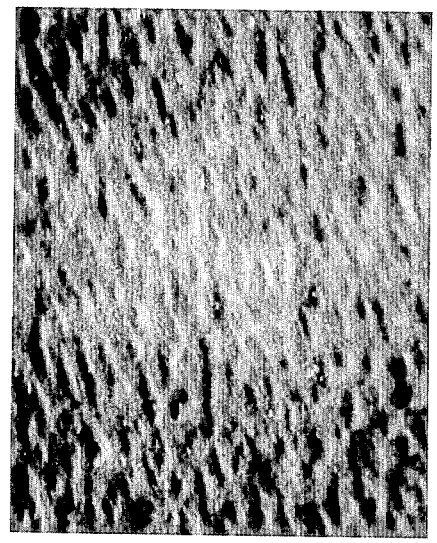
Figure 7C:
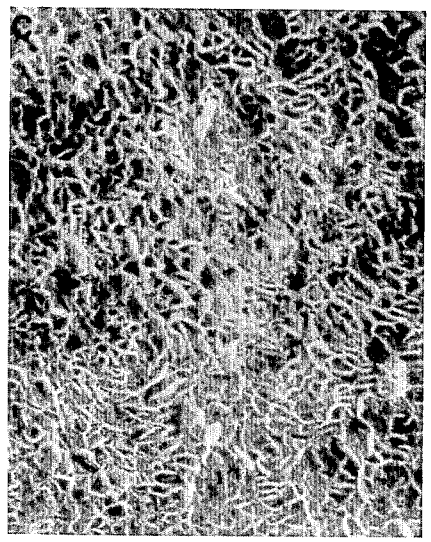
Figure 7D:
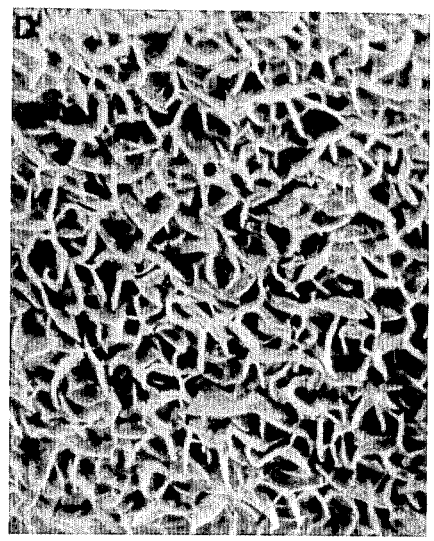
Figure 8A:
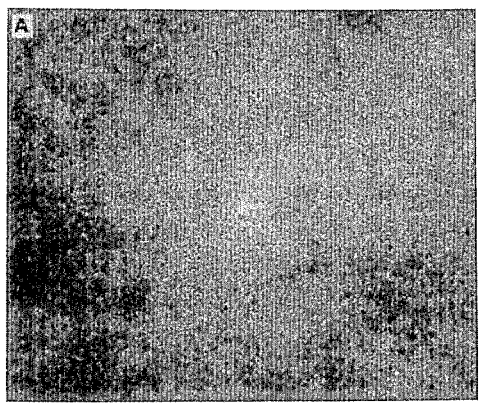
FIGS. 8A, 8B and 8C are low magnification photomicrographs of three examples of supercritical fluid injection molecular spray-formed silica particles or powders in accordance with the invention.
Figure 8B:
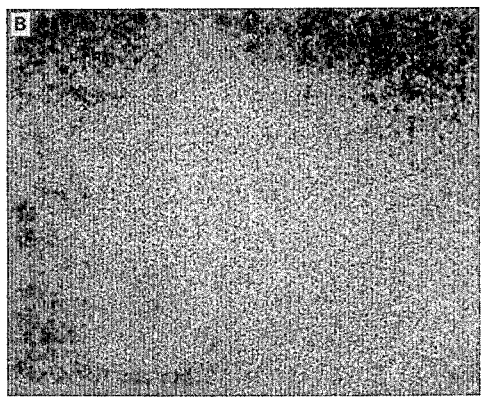
Figure 8C:
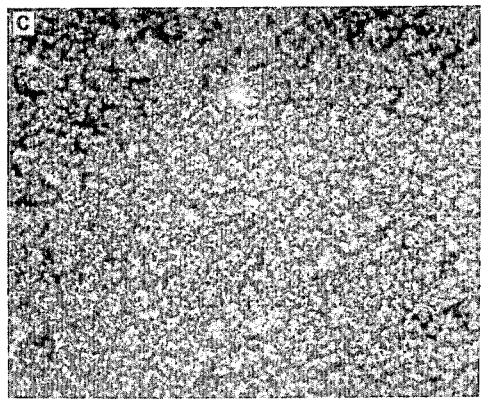
Figure 9A:
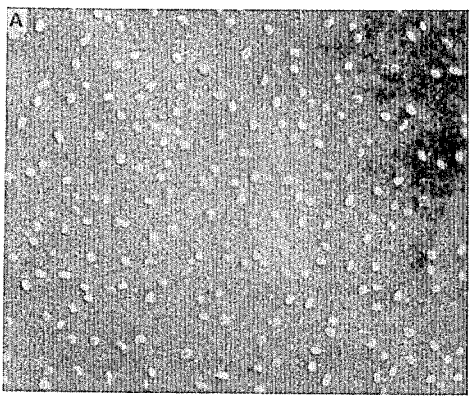
FIGS. 9A, 9B and 9C are ten times magnification photomicrographs of the subject matter of FIGS. 8A, 8B and 8C, respectively.
Figure 9B:
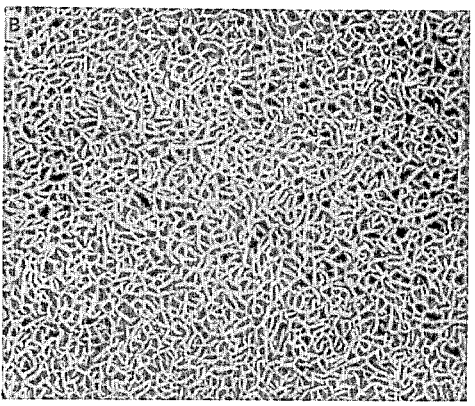
Figure 9C:
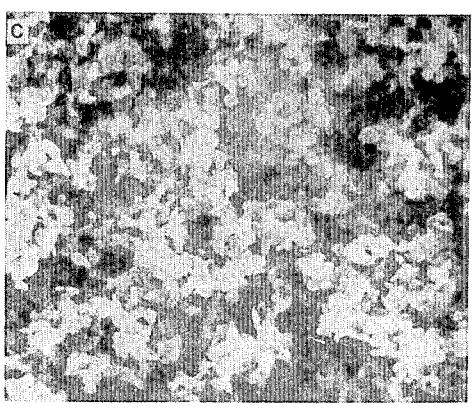

The photomicrographs show that the deposited films range from relatively smooth and uniform (FIGS. 7A and 7B) to complex and having a large surface area (FIGS. 7C and 7D). Similarly, FIGS. 8A, 8B, 8C, 9A, 9B and 9C show powders produced under conditions where nucleation and coagulation are increased. It should be noted that different FIMS restrictors were utilized for these examples. The resulting products are not expected to be precisely reproducible but are representative of the range of films or powders which can be produced using the FIMS process. In addition, different solutes would be expected to change the physical properties of the resulting films and powders.

In general, high injection or flow rates produce a more granular film surface or larger powder sizes, as do higher solute concentrations, and higher expansion chamber pressures. To a certain extent, orifice length and shape will also affect granularity. The deposition rate also increases as the product of solute concentration and the flow rate increase. Solute concentration is a more important determinant of granularity than flow rate. Therefore, to alter granularity it is preferable to vary the solute concentration and to alter deposition rate it is preferable to vary flow rate.

EXAMPLES 3 AND 4

In one example of fiber production polypropylene (isotactic) (melting point ~170° C.) was dissolved in pentane at a temperature of 225° C., a pressure of 2500 psi and a solute concentration of approximately 5% by weight. The solution was expelled through a probe, maintained at a temperature of 225° C., having a nozzle (capillary orifice) with a diameter of 25 μm and a length of about 1 cm, into a chamber maintained at a temperature of 25° C. and a pressure of 15 psi. Fibers of 1 to 4 μm in diameter and lengths in excess of 100 μm, as shown in FIG. 10A, were collected by mounting a glass slide one inch (2.5 cm) from the capillary tip.

In another example of fiber production, polycarbosilane (melting point 195°–237° C., mean molecular weight 1420–1450) was dissolved in pentane at a temperature of 350° C., a pressure of 1000 psi, and a solute concentration of 0.3% by weight. The solution was expelled through a probe maintained at 375° C., having a nozzle with a diameter of 25 μm and a length of 1 cm, into a chamber maintained at 25° C. and a pressure of 760 Torr. (14.7 psi). Fibers as shown in FIG. 10B were obtained ranging in diameter from about 1 to 5 μm and having lengths of about 50 to 150 μm. They were collected by mounting a glass slide one inch (2.5 cm) from the tip. By pyrolysis at 1,000° C., the polycarbosilane fibers can be converted to fibers of silicon carbide, which are useful as a matrix material for ceramic powders, as a ceramic adhesive, and as a binder for ceramic powders.

Having illustrated and described the principles of my invention in several embodiments, with a number of examples illustrating variations thereof, it should be apparent to those skilled in the art that the invention can be modified in arrangement and detail without departing from such principles. Accordingly, I claim all modifications coming within the spirit and scope of the following claims.

REFERENCES

1. Schneider, G. M., E. Stahl and G. Wilke, editors, 1980, "Extraction with Supercritical Gases," Verlag Chemie, Deerfield Beach, Fla.
2. Gouw, T. H., R. E. Jentoft, *Adv. Chromatog.*, 13, 1–40 (1975).
3. Wassen, u. Van I. Swaid and G. M. Schneider, *Agenw. Chem. Int. Ed. Eng.*, 19, 575–587 (1980).
4. Giddings, J. C., M. N. Myers, L. McLaren and R. A. Keller, *Science*, 162, 67–73 (1968).
5. Irani, C. A., and E. W. Funk, in: *Recent Developments in Separation Science*, N. N. Li (Ed.), CRC Press, Cleveland, p. 171 (1977).
6. Schindler, H. D., J. M. Chen, and J. D. Potts, "Integrated Two Stage Liquefaction Topical Technical Progress Report Completion of Indiana V Program," NTIS 14804-Q7 (1982).

7. Prausnitz, J. M., *Molecular Thermodynamics of Fluid Phase Equilibrium*, Prentice-Hall, Englewood Cliffs (1969).
8. Oellrich, L., U. Plocker, J. M. Prausnitz and H. Knapp, *Chem. Ing. Tech.*, 49, 955 (1977).
9. Prausnitz, J. M., *Inst. Chem. Eng. Trans.*, 59, 3 (1981).
10. Peter, S., *Ber Bunsenges. Phys. Chem.*, 81, 950 (1977).
11. Johnson, K. P., and C. A. Eckert, *Amer. Inst. Chem. Eng.*, 27, 773 (1981).
12. Franck, E. U., *Berichte Bunsen-Gesellschaft*, 76, 341 (1972).
13. Hamann, S. D. and M. Liuron, *Trans. Far. Soc.*, 65, 2186 (1968).
14. Kleintjens, L. A., and R. Koringsveld, *J. Electrochem. Soc.*, 127, 2352 (1980).
15. Kleitjens, L. A., and R. Koringsveld, *Sep. Sci. Tech.*, 17, 215 (1982).
16. Vezzetti, D. J., *J. Chem. Phys.*, 77, 1512 (1982).
17. Giddings, J. C., M. N. Myers and J. W. King, *J. Chromatogr. Sci.*, 7, 276-283 (1969).
18. Bowman, L. M., Ph.D. Thesis, University of Utah (1976).
19. Barton, A. F. M., *Chem. Rev.*, 731 (1975).
20. Hoy, K. L., *J. Paint Technol.*, 42, 76 (1970).
21. Konstam, A. H. and Feairheller, *A. I. Ch. E. Journal*, 16, 837 (1970).
22. P. Hubert and O. V. Vitzthum, "Fluid Extraction of Hops, Spices and Tobacco with Supercritical Gases in Extraction with Supercritical Gases," edited by G. M. Schneider and E. Stahl and G. Wilke, Verlag Chemi Weinheim, 1980, pages 26-43.
23. "Assessment of Critical Fluid Extractions in the Process Industries," Critical Systems Incorporated, A. D. Little, Cambridge, Mass. Ecut Biocatholysis, U.S. Department of Energy, JPO-9950-793, April, 1982.
24. Smith, R. D., W. D. Felix, J. C. Fjeldsted and M. L. Lee, *Anal. Chem.*, 54, 1883 (1982).
25. Smith R. D., J. C. Fjeldsted, and M. L. Lee, *J. Chromatog.*, 247, 231-243 (1982).
26. Smith, R. D. and H. R. Udseth, *Biomed. Mass Spectrom*, (1983).
27. Smith, R. D. and H. R. Udseth, *Fuel*, 62, 466-468 (1983).
28. Smith, R. D. and H. R. Udseth, *Sep. Sci. Tech.* 18, 245 (1983).
29. Hagena, O. F., and W. Obert, *J. Chem. Phys.*, 56, 1793 (1972).
30. Randall, L. G. and A. L. Wahrahaftig, *Rev. Sci. Instrum.*, 52, 1283-1295 (1981).

I claim:

1. A method of producing relatively short, ultra-fine fibers comprising:
   forming a solution including a supercritical fluid solvent and a dissolved polymer;
   rapidly expanding said solution through a nozzle having an orifice of predetermined diameter in the range of 10-100 μm into a low pressure region having a pressure substantially below the critical pressure of said solvent and a temperature substantially below the melting point of said polymer;
   maintaining said solution and said nozzle at a temperature above, but close to, the melting point of said polymer and simultaneously above the critical point of the solvent;
   selecting a nozzle length in relation to solution pressure such that the polymer precipitates as a liquid out of solution within the nozzle so that the polymer forms fibers upon discharge from the nozzle; and
   collecting the fibers thus formed.

2. A method according to claim 1 including maintaining the supercritical solution at a pre-expansion temperature such that the solute precipitates out of solution during expansion through the nozzle.

3. A method according to claim 1 in which the collecting step includes positioning a collector at a distance from the orifice such that the fibers have time to cool prior to deposition on the collector.

4. A method according to claim 3 in which said distance is greater than 2.5 cm.

5. A method according to claim 1 in which the polymer and resultant fibers comprise polycarbosilane.

6. A method of producing ultra-fine fibers comprising:
   forming a solution including a primary supercritical fluid solvent having a critical temperature, a dissolved polymer, and a secondary solvent, said secondary solvent having a substantial mutual solubility with said polymer; and
   rapidly expanding said solution through a nozzle having an orifice of predetermined diameter in the range of 10 to 100 μm into a low pressure region having a pressure substantially below the critical pressure of the primary and secondary solvents;
   maintaining the temperature of said solution and said nozzle above the critical temperature of said primary solvent, the secondary solvent having a higher critical temperature than that of said primary solvent so that the polymer forms fibers upon discharge from the nozzle; and
   collecting the fibers thus formed.

7. A method according to claim 6 in which the concentration of secondary solvent is sufficiently low that upon expansion through the orifice and vaporization of the primary supercritical solvent, a transient low-viscosity liquid solution of the polymer and secondary supercritical fluid solvent is formed within the nozzle.

8. A method according to claim 6 including maintaining the supercritical solution at a pre-expansion temperature such that the solute precipitates out of solution during expansion through the nozzle.

9. A method according to claim 6 including selecting a nozzle length in relation to solution pressure such that the polymer precipitates as a liquid out of solution within the nozzle.

10. A method according to claim 6 in which the collecting step includes positioning a collector at a distance from the orifice such that the fibers have time to solidify prior to deposition on the collector.

11. A method of producing ultra-fine polymer fibers, comprising:
   forming a supercritical solution including a supercritical fluid solvent and a dissolved solute of a solid polymer;
   expanding the supercritical solution of said solvent and solute through a common nozzle of a predetermined length and having an orifice of a predetermined diameter in a range of 10 to 100 μm into a low pressure region having a pressure substantially below the critical pressure of the solvent; and
   modifying the polymer in said solution so that, upon expansion, the polymer passes transiently through an intermediate liquid phase within the nozzle and thereby discharges from the orifice into said low pressure region in the form of fibers having a diameter smaller by about an order of magnitude than the orifice diameter.

12. A method according to claim 11 in which modifying the polymer includes elevating the temperature of the supercritical solution just above the melting point of the polymer.

13. A method according to claim 11 which includes providing as said supercritical fluid solvent a primary supercritical solvent having a first critical pressure and temperature and a secondary solvent having a second critical temperature greater than the first temperature so that, upon expansion, the solute and secondary solvent precipitate out of solution with the primary solvent leaving a transient liquid solution of the polymer and secondary solvent.

14. A method according to claim 11 including selecting a nozzle length in relation to solution pressure such that the polymer precipitates as a liquid within the nozzle out of solution with the supercritical fluid solvent.

15. A method according to claim 11 in which the nozzle has a length of about 1 cm and an orifice diameter of about 25 $\mu$m and the resulting fibers have a diameter in a range of 1 to 10 $\mu$m.

* * * * *